United States Patent
Guy et al.

(10) Patent No.: US 12,124,521 B2
(45) Date of Patent: Oct. 22, 2024

(54) WEB CONTENT RELIABILITY CLASSIFICATION

(71) Applicant: MICROSOFT TECHNOLOGY LICENSING, LLC, Redmond, WA (US)

(72) Inventors: Richard T. Guy, Seattle, WA (US); Ho-Joon Felix Lim, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/218,462

(22) Filed: Jul. 5, 2023

(65) Prior Publication Data

US 2023/0350956 A1 Nov. 2, 2023

Related U.S. Application Data

(62) Division of application No. 16/917,287, filed on Jun. 30, 2020, now Pat. No. 11,762,924.

(51) Int. Cl.
 *G06F 16/951* (2019.01)
 *G06F 16/957* (2019.01)
 *G06Q 30/0282* (2023.01)

(52) U.S. Cl.
 CPC .......... *G06F 16/951* (2019.01); *G06F 16/957* (2019.01); *G06Q 30/0282* (2013.01)

(58) Field of Classification Search
 CPC .............................. G06F 16/951; G06F 16/957
 USPC ........................................................ 707/748
 See application file for complete search history.

(56) References Cited

U.S. PATENT DOCUMENTS

| | | | | |
|---|---|---|---|---|
| 10,614,416 | B1 * | 4/2020 | Curlander | B65G 1/02 |
| 2002/0129014 | A1 * | 9/2002 | Kim | G06F 16/951 |
| | | | | 707/999.005 |
| 2006/0059119 | A1 * | 3/2006 | Canright | G06F 16/951 |
| 2007/0244884 | A1 * | 10/2007 | Yang | G06F 16/951 |
| | | | | 707/999.005 |
| 2011/0258049 | A1 * | 10/2011 | Ramer | G06Q 30/0273 |
| | | | | 705/14.69 |

* cited by examiner

*Primary Examiner* — Kuen S Lu
(74) *Attorney, Agent, or Firm* — Shook, Hardy & Bacon L.L.P.

(57) ABSTRACT

Technology described herein assigns a reliability score to web content, such as a web site or portion of a website. In one aspect, an output of the technology is a high reliability score and a low reliability score for a web content. The high reliability score represents conformance to high reliability sites, while the low reliability score represents conformance to low reliability sites. The high reliability score may be generated by first identifying high reliability online content within a compressed web graph. In a first iteration, the high reliability score of the seeds is used to score online content that is linked to the seed sites. At a high level, the more links that originate from high reliability sources, the higher the reliability score for the linked content. The low reliability score is similar, but uses outgoing links to low reliability sites instead of incoming links from high reliability sites.

20 Claims, 9 Drawing Sheets

WEB CONTENT RELIABILITY CLASSIFICATION

CROSS REFERENCE TO RELATED APPLICATIONS

This application is a divisional of U.S. patent application Ser. No. 16/917,287, filed on Jun. 30, 2020, and titled "Web Content Reliability Classification," the entirety of which is hereby incorporated by reference.

BACKGROUND

The Internet provides access to an almost limitless amount of content. The amount of content makes it very difficult for users to find information that is both relevant and authoritative or reliable. Search engines traditionally do a good job of finding relevant information. Relevance can be determined by a number of different features, such as keyword matching, web traffic, clicks in search results, and the like. However, relevance is not always a good proxy for reliability. Some of the most popular websites, which are likely to be determined relevant because of web traffic, contain unreliable information. On the other hand, some obscure content with little traffic could be very reliable. For example, a dentist with a low-traffic page dedicated to providing accurate information about dental hygiene, procedures, and diseases might provide more reliable dental information than popular Q & A sites.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein assign a reliability score to web content, such as a web site or portion of a website. The reliability score can be used to block content, rank content, provide a content warning, and select a source to answer a question, along with other uses. The technology described herein extends initial reliability scores available for a relatively small amount of web content (e.g., web sites) to other web content related to the scored content through links or user actions.

Determining whether information is reliable is an extremely challenging technical problem for machine to solve. Traffic data can indicate whether a source is popular, but popular is not the same thing as reliable. Similarly, natural language processing can be used to determine whether online content is grammatical, but grammatical is also not the same thing as reliable. Determining whether online content is reliable can depend on determining whether a source of the content is reliable. The present technology identifies reliable content by leveraging expert scoring for a small amount of web content by iteratively extending these scores to other content based on how web content is linked. User interactions may also be leveraged.

In one aspect, two different reliability scores are generated using similar mechanisms. The first reliability score may be described as a high reliability score. The high reliability score is generated by first identifying high reliability online content within a web graph. These initially scored sites may be described as seed sites. Ratings for the seed sites may be taken from authoritative lists of known reliable content providers.

In a first iteration, the high reliability score of the seeds is used to score online content that is linked to the seed sites. In order to do this, all the incoming links and the sources of those links are analyzed together to generate a high reliability score for the site being scored. At a high level, the more links that originate from high reliability sources, the higher the reliability score for the linked content. The high reliability scoring process can be repeated in iterations. Initially, only online content that is linked to from reliable online content may receive a score. However, in a second iteration newly scored online content can serve as an input to score other online content that was previously not linked to any scored content. The score of previously scored content can also change based on the presence of incoming links from previously scored content. The iterations may continue until scores for various content stabilizes. In one aspect, the original scores assigned to the seed sites do not change throughout the iterative scoring process.

The low reliability score is similar, but uses outgoing links to low reliability sites instead of incoming links from high reliability sites. These low reliability seed sites may also be initially designated within a web graph. As with the high reliability seed sites, the low reliability seed sites may be derived from editorial analysis identifying unreliable content. The low reliability score is based on the number of links an online content links to. The more low reliability sites linked to, the higher the low reliability score, where higher means a stronger indication of low reliability. The low reliability score process can continue iteratively until scores across the web graph stabilize or some other criteria is satisfied.

In one aspect, an output of the technology is a high reliability score and a low reliability score for a web content. Different applications can consume this score to perform or guide different functions, including search, filtering, content warning generation, and the like.

BRIEF DESCRIPTION OF THE DRAWINGS

Aspects of the invention are described in detail below with reference to the attached drawing figures, wherein.

DETAILED DESCRIPTION

Figure 1:
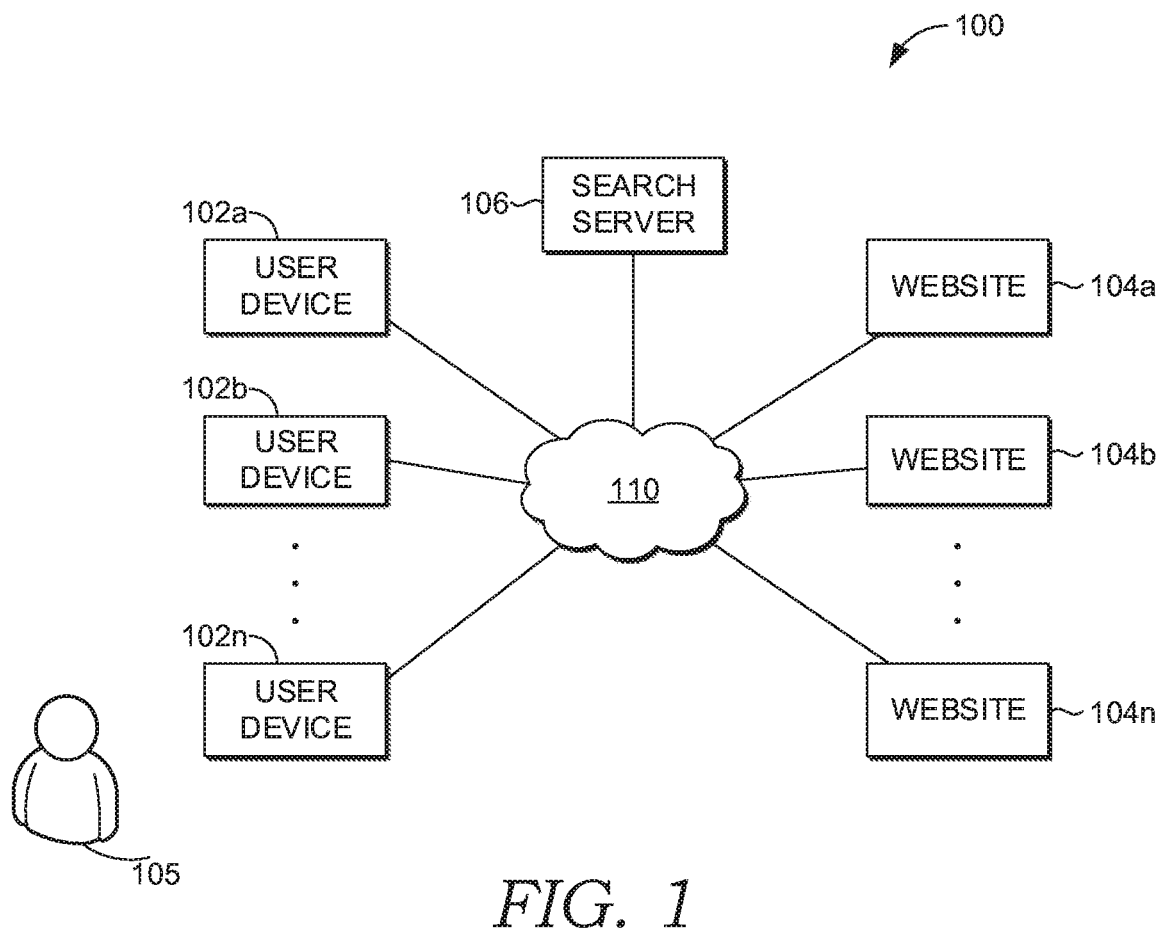
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein assign a reliability score to web content, such as a web site or portion of a website. The reliability score can be used to block content, rank content, provide a content warning, and select a source to answer a question, along with other uses. The technology described herein extends initial reliability scores available for a relatively small amount of web content (e.g., web sites) to other web content related to the scored content through links or user actions.

Determining whether information is reliable is an extremely challenging technical problem for machine to solve. Traffic data can indicate whether a source is popular, but popular is not the same thing as reliable. Similarly, natural language processing can be used to determine whether online content is grammatical, but grammatical is also not the same thing as reliable. Determining whether online content is reliable can depend on determining whether a source of the content is reliable. The present technology identifies reliable content by leveraging expert scoring for a small amount of web content by iteratively extending these scores to other content based on how web content is linked. User interactions may also be leveraged.

The technology described herein leverages the following insights about reliable online content. First, reliable content providers tend to link overwhelmingly to other reliable content providers and typically do not link to unreliable content providers. Second, unreliable content providers may link to both reliable and unreliable content providers. In fact, unreliable content providers may link to reliable content providers to lend an aura of authenticity to their unreliable online content or possibly even to criticize the reliable content. The technology generates reliability scores by leveraging these insights.

In one aspect, two different reliability scores are generated using similar mechanisms. The first reliability score may be described as a high reliability score. The high reliability score is generated by first identifying high reliability online content within a web graph. These initially rated sites may be described as seed sites. Ratings for the seed sites may be taken from authoritative lists of known reliable content providers. The high reliability scores may be generated on a topic by topic basis. For example, a first high reliability score can be generated for a particular area of cancer research and a second high reliability score generated for macroeconomic analysis. These two examples illustrate that reliable sources for these two areas may not overlap and the seed sites for both areas might be different. In an aspect, the reliability scores may be generated on a topic-by-topic basis.

In a first iteration, the high reliability score of the seeds is used to score online content that is linked to the seed sites. In order to do this, all the incoming links and the sources of those links are analyzed together to generate a high reliability score for the site being scored. At a high level, the more links that originate from high reliability sources, the higher the reliability score for the linked content. The high reliability scoring process can be repeated in iterations. Initially, only online content that is linked to from reliable online content may receive a score. However, in a second iteration newly scored online content can serve as an input to score other online content that was previously not linked to any scored content. The score of previously scored content can also change based on the presence of incoming links from previously scored content. The iterations may continue until scores for various content stabilizes. In one aspect, the original scores assigned to the seed sites do not change throughout the iterative scoring process.

The low reliability score is similar, but looks at outgoing links to low reliability sites. These low reliability seed sites may also be initially designated within a web graph. As with the high reliability seed sites, the low reliability seed sites may be derived from editorial analysis identifying unreliable content. The low reliability score is based on the number of links an online content links to. The more low reliability sites linked to, the higher the low reliability score, where higher means a stronger indication of low reliability. The low reliability score process can continue iteratively until scores across the web graph stabilize or some other criteria is satisfied.

In one aspect, an output of the technology is a high reliability score and a low reliability score for a web content. Different applications can consume this score to perform or guide different functions, including search, filtering, provide content warnings, and the like.

In a web graph, web content (e.g., web pages, domains, subdomains) are vertices and the edges connecting vertices represent links, such as hyperlinks, between the entities. The classification process can start with an initial plurality of Internet domains assigned an initial classification score. The initial scores are used to assign classifications to other domains connected by an edge within the web graph. The relationships forming edges can take several forms including inbound hyperlinks, outbound hyperlinks, and user activity in common.

At times, the terms links and edges may be used interchangeably. The links in web content correspond to edges in a web graph.

Turning now to FIG. 1, a block diagram is provided showing an operating environment 100 in which aspects of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of websites, such as websites 104a and 104b through 104n; search server 106; and network 110. It should be understood that environment 100 shown in FIG. 1 is an example of one suitable operating environment. Each of the components shown in FIG. 1 may be implemented via any type of computing device, such as computing device 900, described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and websites may be employed within operating environment 100 within the scope of the present disclosure. Each may comprise a single device or multiple devices cooperating in a distributed environment. For instance, search server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while search server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of search server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user may be associated with one or more user devices. The user may communicate with search server 106, websites 104a and 104b through 104n, through the user devices.

A goal of the technology described herein is to help users find reliable web content, while avoiding unreliable web content. The websites 104a and 104b through 104n may comprise reliable websites and unreliable websites. The user devices 102a and 102b through 102n may access the websites through a browser. The user may find the websites through search results provided by the search service 106 in response to a query. A user of user devices 102a and 102b through 102n could navigate to websites 104a and 104b through 104n by clicking on a hyperlink embedded in a webpage, in an email, in a social post, through an application, and the like. A user could also simply type a URL in the browser's address box. Aspects of the technology may use a web graph of websites 104a and 104b through 104n to identify relationships between the websites and iteratively propagate reliability scores through the web graph.

Figure 2:
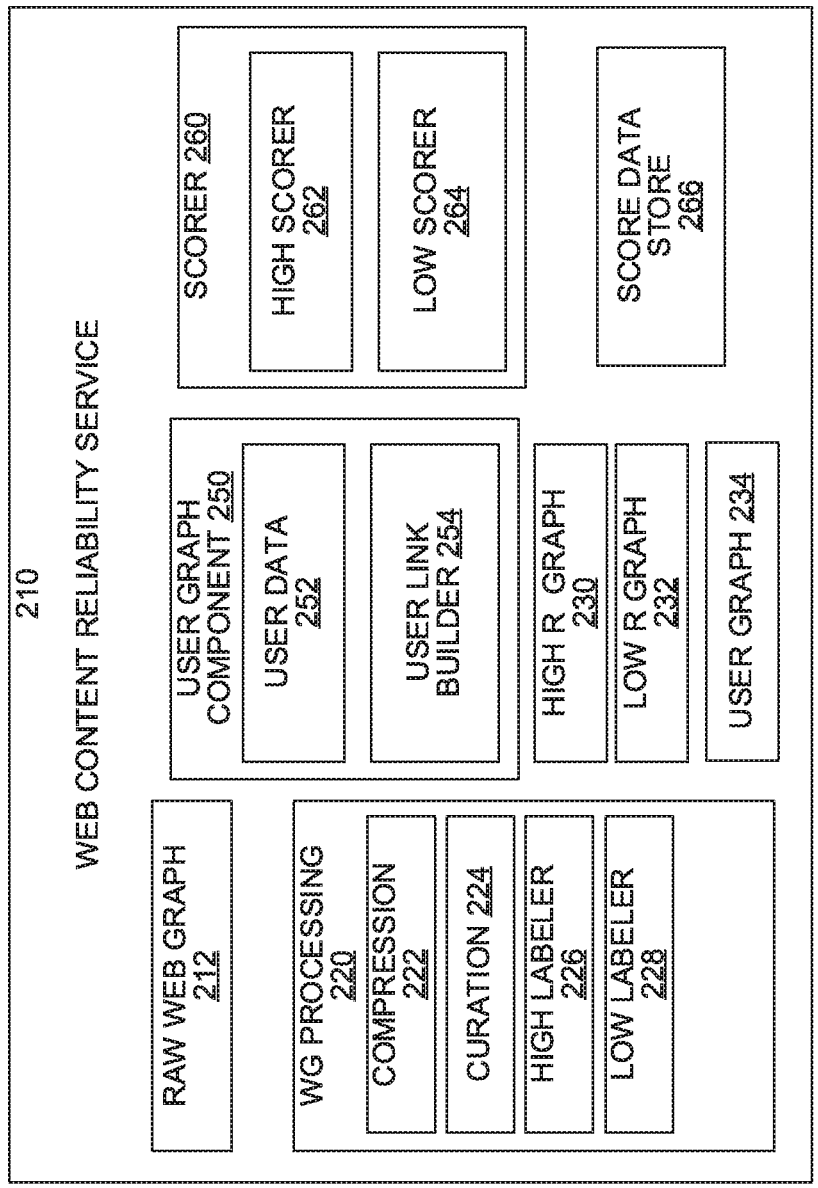
FIG. 2 is a diagram showing a web content reliability service, according to an aspect of the technology described herein.

Operating environment 100 can be utilized to implement one or more of the components of system 200, described in FIG. 2, including components for scoring web content.

Referring now to FIG. 2, with FIG. 1, a block diagram is provided showing aspects of an example computing system architecture suitable for implementing an aspect of the technology and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

At a high level, system 200 comprises a web content reliability service 210 that receives a raw web graph 212, high reliability and low reliability labels, and returns a high reliability score and a low reliability score to web content in the web graph 212. The web content reliability service 210 may be embodied on one or more servers, such as search server 106. Aspects of the web content reliability service 210 could be distributed on a user device, such as device 102a.

Example system 200 includes the web content reliability service 210. The web content reliability service 210 (and its components) may be embodied as a set of compiled computer instructions or functions, program modules, computer software services, or an arrangement of processes carried out on one or more computer systems, such as computing device 900 described in connection to FIG. 9, for example.

In one aspect, the functions performed by components of system 200 are associated with one or more personal assistant applications, browsers, services, or routines. In particular, such applications, services, or routines may operate on one or more user devices (such as user device 102a), servers (such as search server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some aspects, functionality of these components can be shared or distributed across other components.

The raw web graph 212 organizes web content (e.g., web pages, domains, subdomains) as vertices and the edges connecting vertices represent links, such as hyperlinks, between the entities. The relationships forming edges can take several forms including inbound hyperlinks, outbound hyperlinks, and user activity in common.

The web graph processing component 220 modifies the raw web graph 212 to build one or more augmented web graphs that can be processed further by the technology described herein. Example augmented web graphs include the high-reliability web graph 230, the low-reliability web graph 232, and the user-link web graph 234. These graphs will be described in more detail subsequently.

The compression component 222 builds a compressed web graph. The compressed web graph comprises compressed vertices and compressed edges. The compressed web graph can also comprise non-compressed vertices and edges when compression is not possible, such as when only a single edge runs between two vertices. In order to compress vertices, the compression component 222 may combine components from multiple web entities into a single entity. For example, all of the webpages within a domain can be combined to a single vertex representing the domain. This causes all edges of the domain to be associated with a single vertex. Aspects of the invention can define entities differently. One aspect may define entities based on domains. In another aspect, entities are defined based on sub-domains. Other web content definitions are possible. If a domain comprises a single webpage, compression may not be possible and no compression need be performed since it is already fully compressed.

In one aspect, shared domains and subdomains are not collapsed for multiple user sites. The technology may collapse money.cnn.com to cnn.com, while not collapsing Vipin.blogspot.com to blogspot.com. The technology may also not collapse medium.com/Felix to medium.com because medium.com is shared.

In one aspect, the technology is able to identify links originating in user comments on a web site, from links in the main content. Links in the user comments may be deleted completely or down weighted within the compressed web graph. For example, user comment links may be multiplied by 0.001 to give these links diminished weight in the various reliability calculations. In other aspects, user links in the comments are treated the same as all other links on a web site.

The compression component 222 can also convert multiple links or edges between two vertices into a single edge and a weight. The weight can be based on a log (e.g., natural log) of the amount of edges compressed. For example, the weight could be 1+ln 2 if two edges are compressed or 1+ln 9 if nine edges are compressed. An edge formed from a single link can be assigned a weight of 1+ln 1. Adding the 1 to the log when generating the weight prevents a weight value of zero when only a single edge exists between two vertices. Aspects of the technology are not limited for use with the natural log. Other mechanisms can be used to generate weights representative of the amounts of edges or links between web content. The compression component 222 may compress edges running in a single direction. Thus, outbound edges from vertex A to vertex B may be compressed to form a first edge, while inbound edges to vertex A from vertex B may be compressed to form a second edge. In another aspect, a user-edges may be compressed to form a third edge between vertex A and B. The user-edge may be considered bi-directional. Alternatively, user-edges may be compressed with outgoing to form a single edge. User edges may be compressed with incoming edges. Different weight may be given user edges when compressing them with incoming edges or outgoing edges. In general, less weight may be given to user edges. For example, the user edge count may be multiplied by 0.5, 0.25, or some other number before calculating an overall weight for the edge. Thus, if 10 outgoing edges are compressed with 5 user edges the weight calculation could be 1+ln 12.5, where the 12.5 is 10+5(0.5). Other methods of assigning a different weight to user edges are possible.

The compression component 222 can also take other factors into consideration when generating an edge weight. In one aspect, the age of each link to be compressed can be used to adjust the weight. For example, each link may initially be given a count of one. The score of one is then adjusted based on the age of the link, such that older links are given less weight. The age adjustment factor could be linear or exponential. In one aspect, a decay function is used to calculate the age adjustment factor. The result can be that links beyond a certain age are ignored completely or given very little weight.

The compression component 222 can also perform a content change analysis and/or evaluate a content change analysis performed by different component that is not shown. If the content to a linked page has undergone more than a certain threshold change, then the weight given to the link is reduced or the link may be eliminated completely from the evaluation.

The curation component 224 eliminates vertices and corresponding edges based on various boundary criteria about the web content represented by the vertices. As mentioned, the present technology assigns a reliability score to various web content. However, it may not be desirable to assign reliability scores to web content falling into several different categories. For example, it may not desirable to calculate a reliability score for commercial web content, such as e-commerce sites like eBay.com, Amazon.com, Walmart.com, Best Buy.com, and the like. In one aspect, commercial websites and all links to and from the commercial websites are removed from the web graph or otherwise eliminated from subsequent scoring processes. Popular news content (e.g., CNN.COM, FOXNEWS.COM, and NYTIMES.COM) and news aggregators are another category of web content that may be removed. Other categories of web content that may be removed in certain aspects include social media sites, blog hosting sites, video hosting sites, entertainment sites, and any other categories where users are generally not interested in the reliability of web content on the sites or otherwise able to form their own opinion based on brand reputation for the site. When social media sites and blogs are not excluded, the definition of web content can be a social media account or blog. In this case, the social media account or blog can be a vertex in the web graph. All links within the social media or blog account can be compressed as described previously.

The high reliability labeler 226 receives a plurality of web content designated as high reliability and labels vertices corresponding to the web content within a web graph as high reliability vertices. The designated web content may be described as seeds. The high reliability seeds may be received from an entity that identifies high reliability web content for one or more topics of interest. For example, various university groups maintain lists of academic web content that is highly regarded as authoritative on one or more topics. Once high reliability vertices are labeled, the graph can be saved as the high-reliability web graph 230.

The low reliability labeler 228 receives a plurality of web content designated as low reliability and labels vertices corresponding to the web content within a web graph as low reliability vertices. The low reliability seeds may be received from an entity that identifies low reliability web content for one or more topics of interest. For example, various organizations build lists of problematic web content that is not reliable. Once low reliability vertices are labeled, the graph can be saved as the low-reliability web graph 232.

The user-graph component 250 takes the user data 252 builds user links. The user links may be stored in a user-link web graph 234.

The user data 252 can comprise browsing and search data from a plurality of users. Users may be asked to opt in or opt out of providing this information. Browsing data includes web content visits gathered from various sources, such as web browsers and cookies. Each visit record can include information about a machine or user who visited the web content, the date visited, time spent reviewing the web content, and other information. The search data can include a search query, results presented in response to the search query, and results a single user clicked on.

The user-link builder 254 uses user data and a link criteria to build user links. User links are distinct from hyperlinks or other links native to the web content. The user links are built in response to user actions fitting a criteria that indicates two web contents are similar. For example, one criteria for forming a user link may be a user navigating to two different web contents within a single browsing session. The browsing session may be determined by a threshold period of time, such as a day. The browsing session can also be defined by opening and subsequently closing the browser. All actions taken between opening a browser enclosing a browser can be considered within a browsing session. Other criteria can be combined to define a browsing session, such as the computing device remaining in an active state, in contrast to a standby state. Thus, a browsing session could be defined as a period between when a user opened a browser and the computing device remained in an active state. Closing the browser or having the computing device transition to a standby state would terminate a browsing session. Transition back to an active state can mark the start of a second browsing session that could be ended by closing the browser or the computing device moving into a standby state. Other criteria are possible. Once user links are generated they can be stored in the user-link web graph 234. The user links serve as edges between vertices in the user-link web graph 234. The vertices on either end of an edge on the websites visited.

The high-reliability web graph 230 is a web graph with one or more vertices associated with a high reliability score. Initially, the high-reliability web graph 230 can include vertices labeled based on the seed high reliability sites. As high reliability scoring progresses through various iterations, the high-reliability web graph 230 can be updated to record these new scores. In aspects, the original seed scores may be fixed while all other scores can change as scoring progresses through various iterations. The high-reliability web graph 230 can also include user links or edges into which user links were compressed. The high-reliability web graph 230 may be a compressed web graph that has also been curated, as described previously.

The low-reliability web graph 232 is a web graph with one or more vertices associated with a low reliability score. Initially, the low-reliability web graph 232 can include vertices labeled based on the seed low reliability sites. As low reliability scoring progresses through various iterations, the low-reliability web graph 232 can be updated to record these new scores. In aspects, the original seed scores may be fixed while all other scores can change as scoring progresses through various iterations. The low-reliability web graph 232 can also include user links or edges into which user links were compressed. The low-reliability web graph 232 may be a compressed web graph that has also been curated, as described previously.

The user-link web graph 234 comprises vertices connected by user links. The vertices are representative of web content. In aspects, multiple user links between the same vertices may be compressed into a single edge. The user-link web graph 234 search is one way to store the user links generated by the user-link builder 254.

The high reliability scorer 262 propagates high reliability scores across a web graph is described subsequently with reference to FIG. 6.

The low reliability scorer 264 propagates low reliability scores across a web graph is described subsequently with reference to FIG. 7.

The score data store 266 stores both high and low reliability scores an individual web content. The score data store 266 may be updated at the conclusion of a scoring process completed by the high reliability scorer 262 and/or the low reliability scorer 264. The score data store 266 can store the high and low reliability scores for a web content and reverse lookup index or some other data structure from which the scores can be efficiently retrieved.

Figure 3:
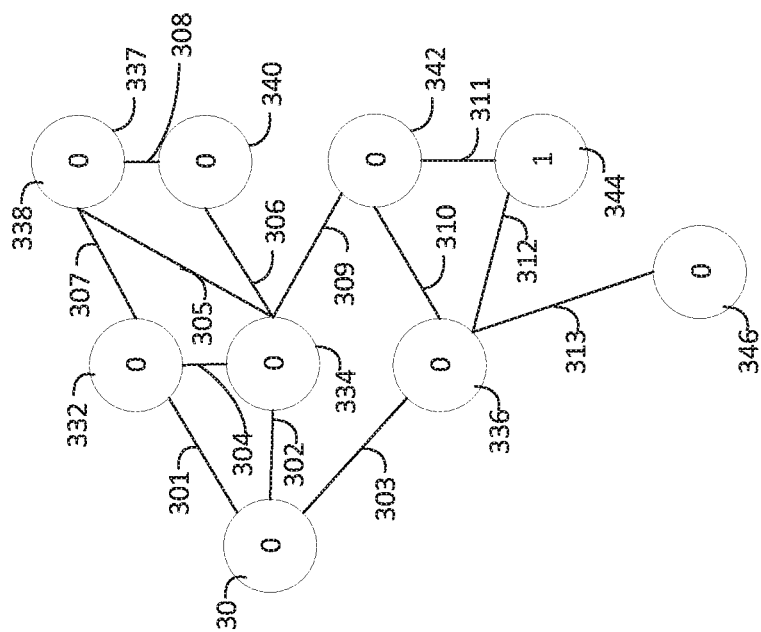
FIG. 3 is an illustration of a web graph with a seed reliability value, according to an aspect of the technology described herein.

Turning now to FIG. 3, an initial high reliability web graph 300A is provided. The web graph includes vertices 330, 332, 334, 336, 338, 340, 342, 344, and 346. These vertices are connected by edges 301, 302, 303, 304, 305, 306, 307, 308, 309, 310, 311, 312, and 313. As can be seen, all vertices are assigned a score of zero except vertex 344, which is assigned a score of one. In this example, vertex 344 is the only seed vertex in a portion of the web graph shown. The web graph 300A is representative of a graph state before any additional scoring occurs.

Figure 4:
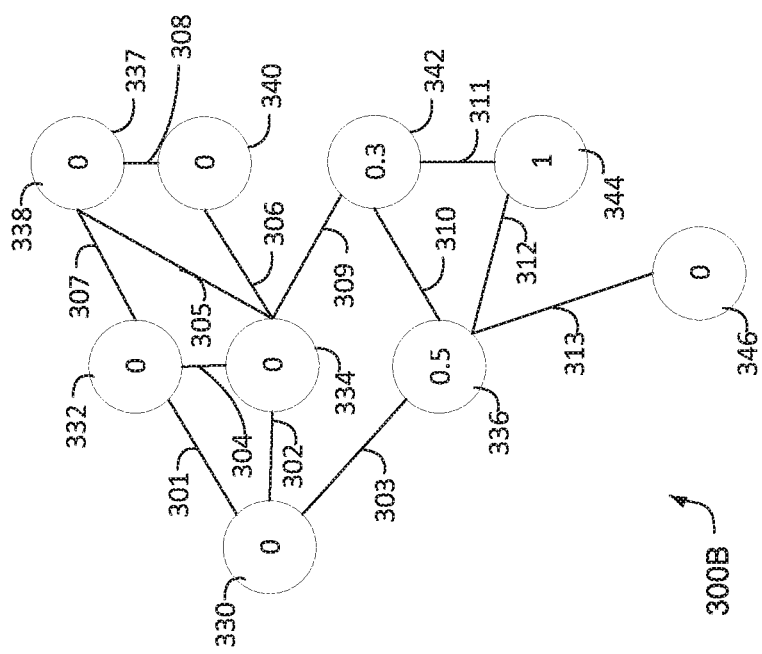
FIG. 4 is an illustration of a web graph with updated reliability values after a first scoring iteration, according to an aspect of the technology described herein.

Turning now to FIG. 4, a high reliability web graph 300B after a first iteration of scoring is provided. As described previously, high reliability scores are propagated to other vertices based on inbound links represented by edges. As can be seen, vertex 336 has an inbound edge 312 from vertex 344. Vertex 342 has an inbound edge 311 from vertex 344. Each vertex in the web graph 300B is associated with a weight (not shown). For the sake of illustrating the calculation of a high reliability score, edge 311 has a weight of three, edge 310 has a weight of five, and edge 309 as a weight of two. As described previously, the weights can be calculated using the log of the amount of edges compressed into a single edge. Other factors, such as the age an individual link, could be used to calculate a weight.

Calculating the score for vertex 342 comprises multiplying the weight associated with each edge by the present score associated with the vertex connected to the edges and then dividing by the sum of the weights. Multiplying the vertex 344 score of 1 by the edge 311 weight of 3 equals 3. Because the vertex scores for all other vertices connected to by an edge to vertex 342 are our zero, the sum of the initial edge/vertex calculation is 3. The sum of three is then divided by the sum of the weights of the incoming edges to vertex 342. The sum of these weights given previously is 10. This results in a final high reliability score of 0.3 for the first iteration.

Vertex 336 initially has a score of zero, as shown in FIG. 3. The first iteration score of 0.5 shown in FIG. 4 is the result of a first iteration score calculation. The score of zero should be used to calculate the first iteration score for vertex 342. The first iteration score of 0.5 can be used for the second iteration scoring of vertex 342, which will increase the score assigned to vertex 342 in the second iteration.

Figure 5:
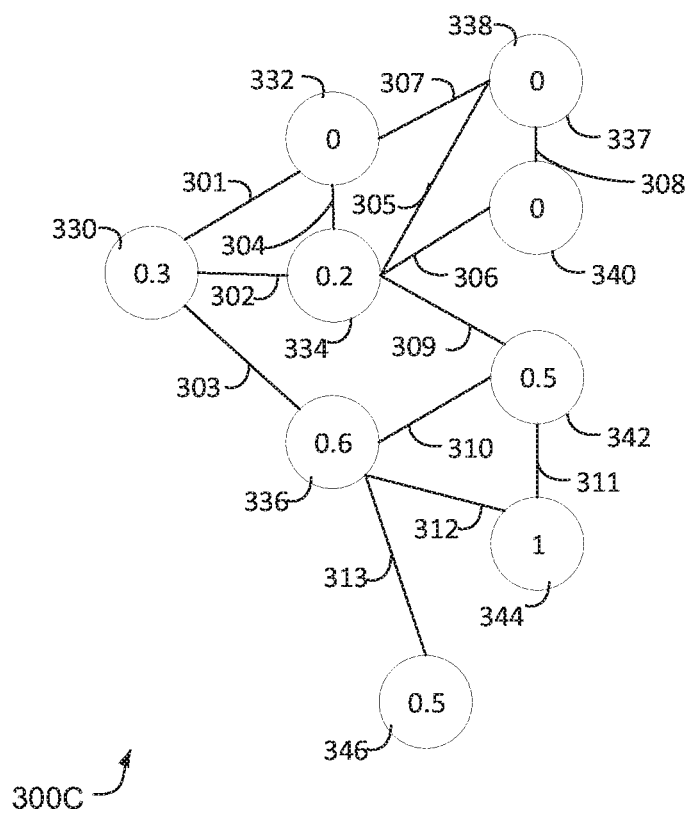
FIG. 5 is an illustration of a web graph with updated reliability values after a second scoring iteration, according to an aspect of the technology described herein.

Turning now to FIG. 5, a high reliability web graph 300C after a second iteration of scoring is provided. The web graph 300C is the same as the web graph 300B, except that the high reliability scores associated with several vertices have changed, as shown.

Figure 6:
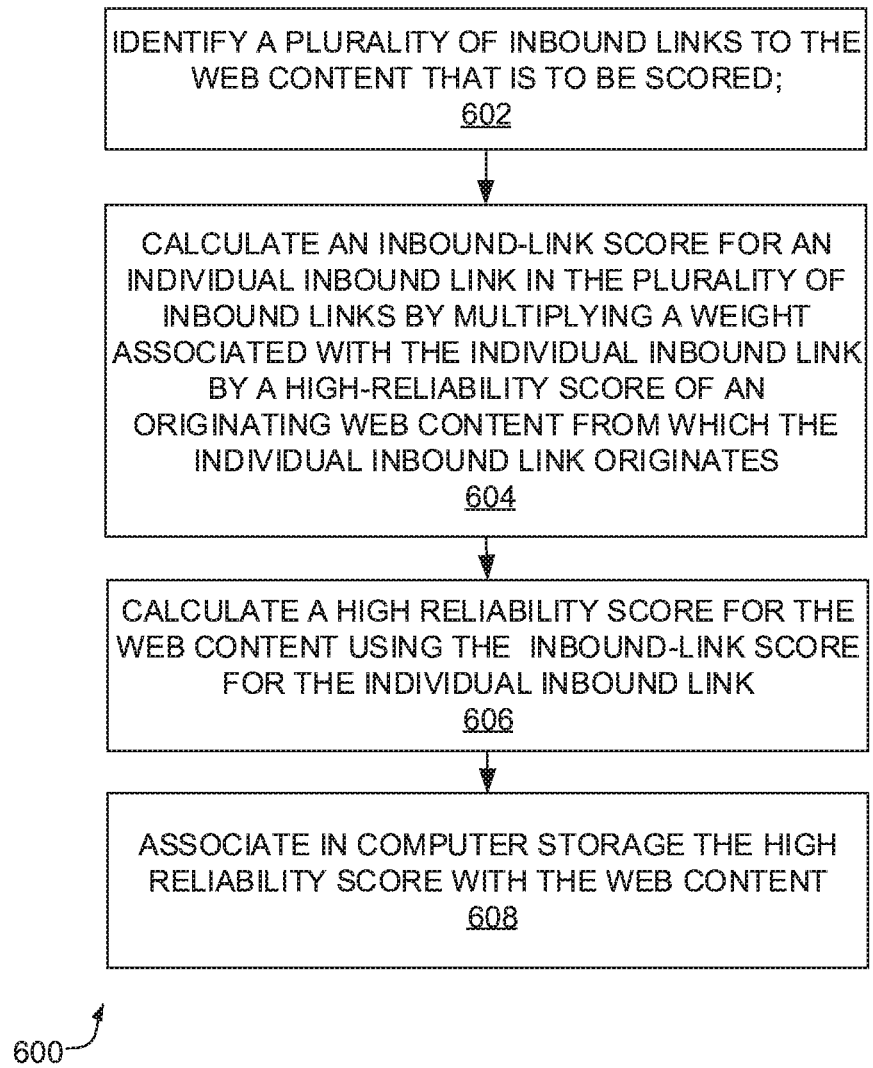
FIGS. 6-8 are an exemplary process flow diagram showing a method of assigning a reliability score to a web content, according to an aspect of the technology described herein.

Turning now to FIG. 6, a method 600 of assigning a reliability score to a web content is provided. Method 600 may be performed by web content reliability service 210.

At step 610 the method includes, identifying a plurality of inbound links to the web content that is to be scored. In one aspect, the plurality of inbound links are identified by evaluating a vertex associated with the web content in a web graph, such as high-reliability web graph 230 described previously. The web graph used as part of method 600 may be a compressed and curated web graph, as described previously. All of the inbound edges to the web content may be associated with weights. The weight for an individual edge can be representative of an amount of inbound links compressed between the web content and originating web content. Other factors, such as the age of the link, can be used to form a weight. Similarly, the weight can be reflective of the presence of one or more user links compressed into the edge. User links may be given the same weight as a hyperlink or be given more or less weight during compression.

At step 620 the method includes, calculating an inbound-link score for an individual inbound link in the plurality of inbound links by multiplying a weight associated with the individual inbound link by a high-reliability score of an originating web content from which the individual inbound link originates. For example, if the high reliability score of the originating web content was 0.7 and the weight of the edge corresponding to the inbound link is five, then the inbound link score would be 3.5.

At step 630 the method includes, calculating a high reliability score for the web content using the inbound-link score for the individual inbound link. The inbound link score may be combined with the inbound link score of other inbound links to the web content to form a sum of inbound link scores. The high reliability score may be the sum of inbound link scores divided by the sum of weights associated with the edges inbound to the web content.

At step 640 the method includes, associating in computer storage the high reliability score with the web content. Once stored, the high reliability score can be retrieved for various purposes and used to provide a service, such as a reliability warning, to rank websites in response to a search query, and the like.

Figure 7:
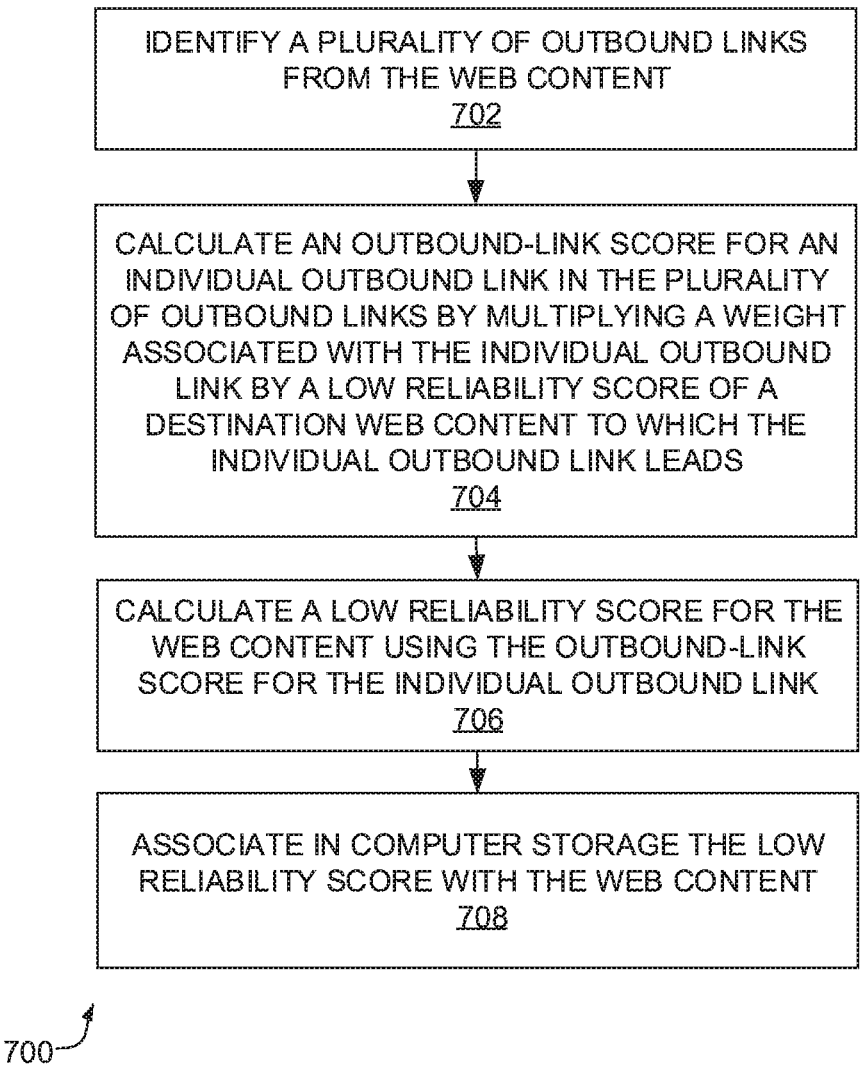

Turning now to FIG. 7, a method 700 of assigning a reliability score to a web content is provided. Method 700 may be performed by web content reliability service 210.

At step 710 the method includes, identifying a plurality of outbound links from the web content. In one aspect, the plurality of outbound links are identified by evaluating a vertex associated with the web content in a web graph, such as low-reliability web graph 232 described previously. The web graph used as part of method 700 may be a compressed and curated web graph, as described previously. All of the outbound edges from the web content may be associated with weights. The weight for an individual edge can be representative of an amount of outbound links compressed between the web content and destination web content. Other factors, such as the age of the link, can be used to form a weight. Similarly, the weight can be reflective of the presence of one or more user links compressed into the edge. User links may be given the same weight as a hyperlink or be given more or less weight during compression.

At step 720 the method includes, calculating an outbound-link score for an individual outbound link in the plurality of outbound links by multiplying a weight associated with the individual outbound link by a low reliability score of a destination web content to which the individual outbound link leads. For example, if the low reliability score of the destination web content was −0.5 and the weight of the edge corresponding to the inbound link is five, then the inbound link score would be −2.5. In this example, a lower score equals a lower reliability.

At step 730 the method includes, calculating a low reliability score for the web content using the outbound-link score for the individual outbound link. The outbound link score may be combined with the outbound link score of other outbound links to the web content to form a sum of outbound link scores. The low reliability score may be the sum of outbound link scores divided by the sum of weights associated with the edges outbound from the web content.

At step 740 the method includes, associating in computer storage the low reliability score with the web content. Once stored, the low reliability score can be retrieved for various purposes and used to provide a service, such as a reliability warning, to rank websites in response to a search query, and the like.

Figure 8:
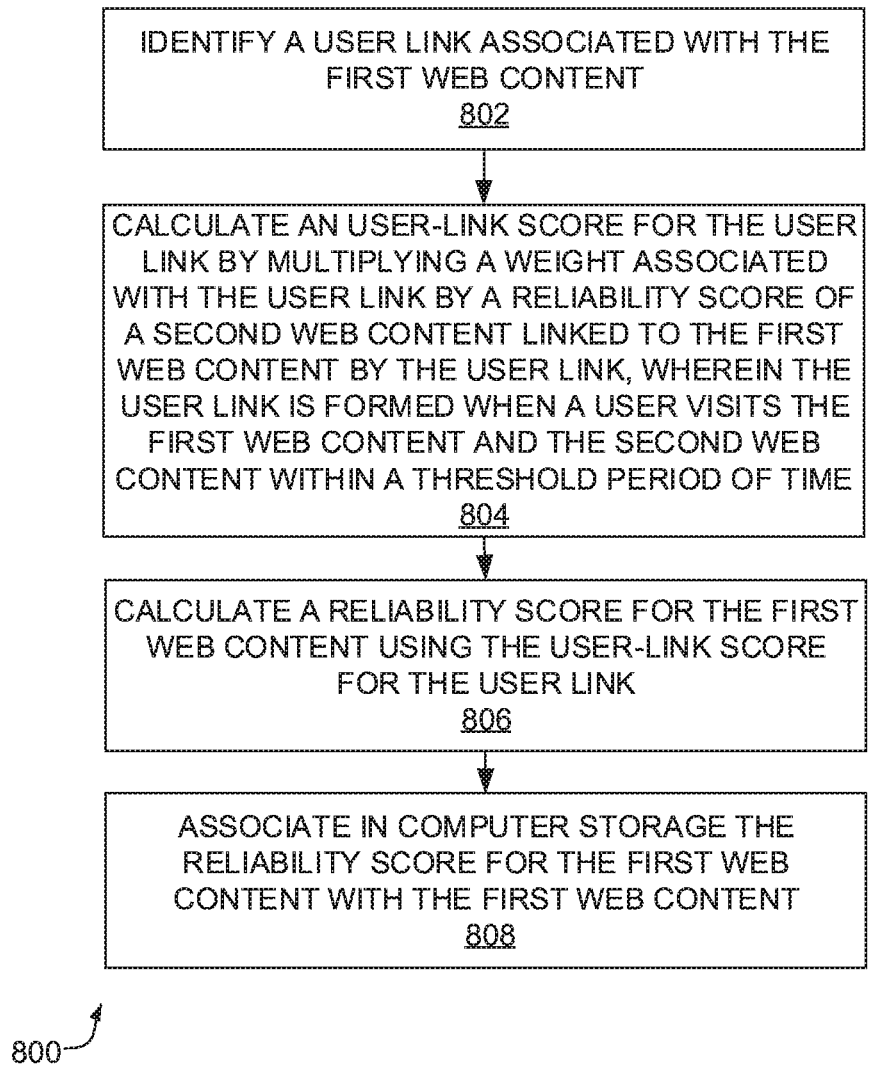

Turning now to FIG. 8, a method 800 of assigning a reliability score to a web content is provided. Method 800 may be performed by web content reliability service 210.

At step 810 the method includes, identifying a user link associated with the first web content. The identification of user links have been described previously with reference to FIG. 2.

At step 820 the method includes, calculating a user-link score for the user link by multiplying a weight associated with the user link by a reliability score of a second web content linked to the first web content by the user link. The user link is formed when a user visits the first web content and the second web content within a threshold period of time. The weight can represent an amount of user links compressed to form a single edge in a user graph. The weight can represent the age of the link as determined by when the user action used for form the link occurred.

At step 830 the method includes, calculating a reliability score for the first web content using the user-link score for the user link. The reliability score could be a high reliability score or low reliability score. In the case of a high reliability score, the user link score may be combined with outbound link scores to calculate the reliability score. In the case of a low reliability score, the user link score may be combined with inbound link scores to calculate the reliability score. In one aspect, user link scores are used in these calculations when the user link forms the only link between two web contents. When hyperlinks links also exist between two web contents the user link may be compressed with the hyperlinks to form a single edge.

At step 840 the method includes, associating in computer storage the reliability score for the first web content with the first web content. Once stored, the reliability score can be retrieved for various purposes and used to provide a service, such as a reliability warning, to rank websites in response to a search query, and the like.

Figure 9:
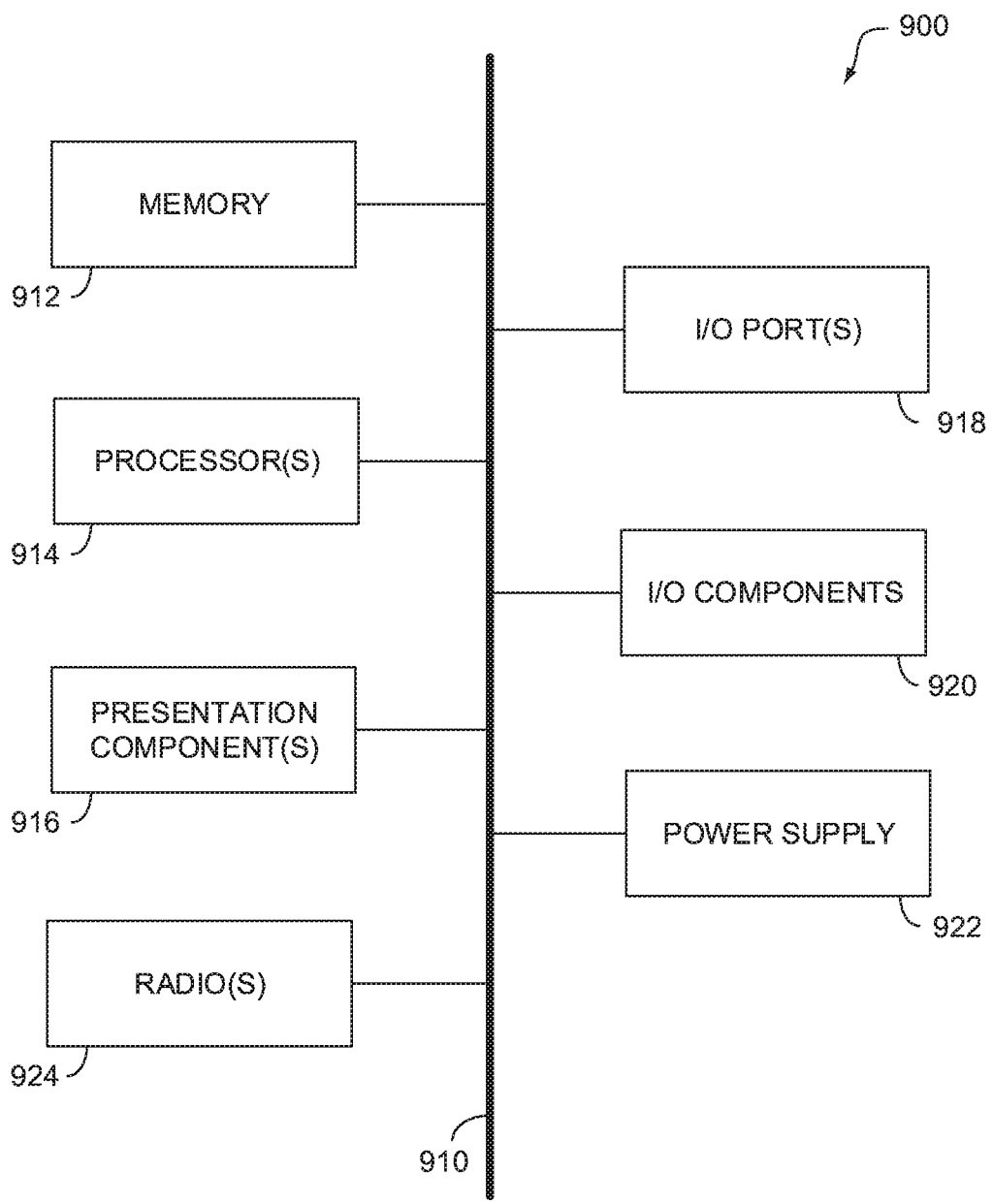
FIG. 9 is a block diagram of an exemplary computing environment suitable for use in implementing an aspect of the technology.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the present technology. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc.

The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some aspects of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. One or more computer storage media having computer-executable instructions embodied thereon that, when executed, by one or more processors, causes the one or more processors to perform a method of assigning a reliability score to a web content, the method comprising:

identifying a plurality of outbound links from the web site that is to be scored;

calculating an outbound-link score for an individual outbound link in the plurality of outbound links by multiplying a weight associated with the individual outbound link by a low reliability score of a destination web site to which the individual outbound link leads, wherein the low reliability score indicates that a ranking entity determined that the originating web site provides inaccurate content;
calculating a low reliability score for the web site using the outbound-link score for the individual outbound link; and
associating in computer storage the low reliability score with the web site.

2. The media of claim 1, wherein the plurality of outbound links to the web site are identified using a collapsed web graph comprising a subset of vertices designated as low reliability and no vertices designated as high reliability.

3. The media of claim 1, wherein the method further comprises generating a compressed web graph by collapsing edges having common endpoints into a single edge and a corresponding weight represented of an amount of edges collapsed and combining content from multiple web pages under a single domain into a single vertex.

4. The media of claim 3, wherein the corresponding weight is a natural log of the amount of edges collapsed.

5. The media of claim 1, wherein the weight is based on a user link between the web site and the destination web site, wherein the user link is formed when a user visits the web site and the destination web site within a threshold period of time.

6. The media of claim 1, wherein the method further comprises:
identifying a plurality of inbound links to the web site that is to be scored;
calculating an inbound-link score for an individual inbound link in the plurality of inbound links by multiplying a weight associated with the individual inbound link by a high-reliability score of an originating web site from which the individual inbound link originates;
calculating a high reliability score for the web site using the inbound-link score for the individual inbound link; and
associating in computer storage the high reliability score with the web site.

7. The media of claim 1, wherein the calculating the low reliability score comprises generating a sum of outbound-link scores for the plurality of outbound links from the web site and diving the sum by a sum of weights associated with the plurality of outbound links.

8. A method of assigning a reliability score to a web site, the method comprising:
identifying a plurality of outbound links from the web site that is to be scored;
calculating an outbound-link score for an individual outbound link in the plurality of outbound links by multiplying a weight associated with the individual outbound link by a low reliability score of a destination web site to which the individual outbound link leads, wherein the low reliability score indicates that a ranking entity determined that the originating web site provides inaccurate content;
calculating a low reliability score for the web site using the outbound-link score for the individual outbound link; and
associating in computer storage the low reliability score with the web site.

9. The method of claim 8, wherein the plurality of outbound links to the web site are identified using a collapsed web graph comprising a subset of vertices designated as low reliability and no vertices designated as high reliability.

10. The method of claim 8, further comprising generating a compressed web graph by collapsing edges having common endpoints into a single edge and a corresponding weight represented of an amount of edges collapsed and combining content from multiple web pages under a single domain into a single vertex.

11. The method of claim 10, wherein the corresponding weight is a natural log of the amount of edges collapsed.

12. The method of claim 8, wherein the weight is based on a user link between the web site and the destination web site, wherein the user link is formed when a user visits the web site and the destination web site within a threshold period of time.

13. The method of claim 8, further comprising:
identifying a plurality of inbound links to the web site that is to be scored;
calculating an inbound-link score for an individual inbound link in the plurality of inbound links by multiplying a weight associated with the individual inbound link by a high-reliability score of an originating web site from which the individual inbound link originates;
calculating a high reliability score for the web site using the inbound-link score for the individual inbound link; and
associating in computer storage the high reliability score with the web site.

14. The method of claim 8, wherein the calculating the low reliability score comprises generating a sum of outbound-link scores for the plurality of outbound links from the web site and diving the sum by a sum of weights associated with the plurality of outbound links.

15. The method of claim 8, wherein the low reliability score is specific to one subject matter domain.

16. A system comprising:
at least one computer processor; and
one or more computer storage media storing computer-useable instructions that, when used by the at least one computer processor, cause the system to perform operations comprising:
identifying a plurality of outbound links from the web site that is to be scored;
calculating an outbound-link score for an individual outbound link in the plurality of outbound links by multiplying a weight associated with the individual outbound link by a low reliability score of a destination web site to which the individual outbound link leads, wherein the low reliability score indicates that a ranking entity determined that the originating web site provides accurate content;
calculating a low reliability score for the web site using the outbound-link score for the individual outbound link; and
associating in computer storage the low reliability score with the web site.

17. The system of claim 16, wherein the plurality of outbound links to the web site are identified using a collapsed web graph comprising a subset of vertices designated as low reliability and no vertices designated as high reliability.

18. The system of claim 16, wherein the method further comprises generating a compressed web graph by collapsing edges having common endpoints into a single edge and a corresponding weight represented of an amount of edges collapsed and combining content from multiple web pages under a single domain into a single vertex.

19. The system of claim 16, wherein the weight is based on a user link between the web site and the destination web site, wherein the user link is formed when a user visits the web site and the destination web site within a threshold period of time.

20. The system of claim 16, wherein the method further comprises:
- identifying a plurality of inbound links to the web site that is to be scored;
- calculating an inbound-link score for an individual inbound link in the plurality of inbound links by multiplying a weight associated with the individual inbound link by a high-reliability score of an originating web site from which the individual inbound link originates;
- calculating a high reliability score for the web site using the inbound-link score for the individual inbound link; and
- associating in computer storage the high reliability score with the web site.

\* \* \* \* \*